(12) United States Patent
Bell

(10) Patent No.: US 9,297,469 B2
(45) Date of Patent: Mar. 29, 2016

(54) VALVE SEAT ASSEMBLIES

(71) Applicant: Fisher Controls International LLC, Marshalltown, IA (US)

(72) Inventor: Brandon Wayne Bell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 108 days.

(21) Appl. No.: 13/895,973

(22) Filed: May 16, 2013

(65) Prior Publication Data

US 2014/0264138 A1     Sep. 18, 2014

Related U.S. Application Data

(63) Continuation-in-part of application No. 13/828,539, filed on Mar. 14, 2013.

(51) Int. Cl.
*F16K 1/42* (2006.01)
*F16K 25/00* (2006.01)
*F16K 47/08* (2006.01)
(Continued)

(52) U.S. Cl.
CPC .............. *F16K 25/005* (2013.01); *B25B 13/481* (2013.01); *B25B 13/50* (2013.01); *B25B 27/24* (2013.01); *F16J 15/125* (2013.01); *F16J 15/126* (2013.01); *F16K 1/42* (2013.01); *F16K 1/427* (2013.01); *F16K 3/243* (2013.01); *F16K 3/246* (2013.01); *F16K 47/08* (2013.01); *Y10T 137/0491* (2015.04); *Y10T 137/6065* (2015.04)

(58) Field of Classification Search
CPC ........... F16K 1/42; F16K 1/422; F16K 3/246; F16K 25/005; F16K 3/243; F16K 47/08
USPC ........................... 137/315.27, 15.18; 251/364
See application file for complete search history.

(56) References Cited

U.S. PATENT DOCUMENTS 1,331,305 A   2/1920   Wilkinson
1,465,349 A   8/1923   Cunningham et al.
(Continued)

FOREIGN PATENT DOCUMENTS

CN   202418891   9/2012
GB   1561159   2/1980
(Continued)

OTHER PUBLICATIONS

The State Intellectual Property Office of the People's Republic of China, "The First Office Action," issued in connection with Chinese Patent Application No. 201080068351.6, mailed on Apr. 14, 2014, 25 pages.

(Continued)

*Primary Examiner* — Kevin Lee
(74) *Attorney, Agent, or Firm* — Hanley, Flight & Zimmerman, LLC

(57) ABSTRACT

Valve seat assemblies are disclosed herein. An example apparatus includes a valve seat assembly including a cage and a valve seat coupled to the cage. The valve seat assembly is to be disposed in a valve body. The example apparatus also includes a seal having a first side, a second side, a third side and a fourth side. The first side, the second side and the third side are to be in contact with the valve seat assembly, and the fourth side is to be in contact with the valve body.

25 Claims, 8 Drawing Sheets

(51) Int. Cl.
*B25B 13/50* (2006.01)
*B25B 27/24* (2006.01)
*F16K 3/24* (2006.01)
*B25B 13/48* (2006.01)
*F16J 15/12* (2006.01)

(56) References Cited

U.S. PATENT DOCUMENTS

| | | | |
|---|---|---|---|
| 1,595,246 | A | 8/1926 | Ragsdale |
| 2,192,339 | A | 3/1940 | Wilson |
| 2,397,574 | A | 4/1946 | Thonet |
| 4,130,285 | A | 12/1978 | Whitaker |
| 4,834,133 | A | 5/1989 | LaCoste et al. |
| 5,056,757 | A | 10/1991 | Wood |
| 5,129,625 | A | 7/1992 | Wood et al. |
| 5,247,960 | A | 9/1993 | Kornfeldt et al. |
| 6,637,452 | B1 | 10/2003 | Alman |
| 6,641,112 | B2 | 11/2003 | Antoff et al. |
| 6,840,520 | B2 | 1/2005 | Faas et al. |
| 6,974,121 | B2 | 12/2005 | Koester et al. |
| 7,484,710 | B2 | 2/2009 | Koester et al. |
| 7,854,239 | B2 * | 12/2010 | Wears et al. ............... 137/625.4 |
| 8,167,269 | B2 | 5/2012 | Bell et al. |
| 2002/0017327 | A1 * | 2/2002 | Kawaai et al. ............. 137/625.3 |
| 2003/0116920 | A1 | 6/2003 | Friend et al. |
| 2003/0159737 | A1 | 8/2003 | Stares |
| 2003/0226600 | A1 | 12/2003 | Stares et al. |
| 2004/0145120 | A1 | 7/2004 | Faas et al. |
| 2006/0048826 | A1 | 3/2006 | Gossett et al. |
| 2006/0207666 | A1 | 9/2006 | Micheel et al. |
| 2008/0012324 | A1 | 1/2008 | Dole et al. |
| 2008/0264504 | A1 | 10/2008 | Gossett et al. |
| 2009/0020720 | A1 | 1/2009 | Davies, Jr. et al. |
| 2009/0127488 | A1 | 5/2009 | McCarty et al. |
| 2009/0218536 | A1 | 9/2009 | Wears et al. |
| 2010/0044613 | A1 | 2/2010 | Gossett et al. |
| 2010/0288954 | A1 | 11/2010 | Czimmek et al. |
| 2010/0301240 | A1 | 12/2010 | Bell et al. |
| 2010/0301253 | A1 | 12/2010 | Perrault et al. |
| 2011/0012046 | A1 | 1/2011 | Bell |
| 2011/0179911 | A1 | 7/2011 | Whitehead |
| 2012/0319027 | A1 | 12/2012 | Dobbs et al. |
| 2014/0264135 | A1 | 9/2014 | Bell |

FOREIGN PATENT DOCUMENTS

| | | |
|---|---|---|
| GB | 2318315 | 4/1998 |
| JP | 2005147213 | 6/2005 |
| JP | 2009523968 | 6/2009 |
| TW | M439662 | 10/2012 |
| WO | 2007081640 | 7/2007 |
| WO | 2009012168 | 1/2009 |
| WO | 2009105405 | 8/2009 |
| WO | 2012012951 | 2/2012 |

OTHER PUBLICATIONS

The State Intellectual Property Office of the People's Republic of China, "The Second Office Action," issued in connection with Chinese Patent Application No. 201080068351.6, mailed on Nov. 15, 2014, 6 pages.
International Searching Authority, "International Search Report," issued in connection with application No. PCT/CN2010/075607, on May 5, 2011, 5 pages.
International Searching Authority, "Written Opinion of the International Searching Authority", issued in connection with application No. PCT/CN2010/075607, on May 5, 2011, 5 pages.
International Searching Authority, "International Search Report," issued in connection with corresponding International patent application No. PCT/US2014/022251, mailed on Jul. 10, 2014, 2 pages.
International Searching Authority, "International Written Opinion," issued in connection with corresponding International patent application No. PCT/US2014/022251, mailed on Jul. 10, 2014, 6 pages.
International Searching Authority, "Invitation to Pay Additional Fees and, Where Applicable, Protest Fee," issued in connection with corresponding international patent application No. PCT/US2014/022255, mailed on Jul. 10, 2014, 4 pages.
International Searching Authority, "International Search Report," issued in connection with corresponding International patent application No. PCT/US2014/022255, mailed on Nov. 4, 2014, 4 pages.
International Searching Authority, "Written Opinion of the International Searching Authority," issued in connection with corresponding International patent application No. PCT/US2014/022255, mailed on Nov. 4, 2014, 10 pages.
Japanese Patent Office, "Notice of Reasons for Refusal," issued in connection with Japanese Patent Application No. 2013-520943, with English translation, mailed Jun. 11, 2014, 8 pages.
The United States Patent and Trademark Office, "Non-Final Office Action," issued in connection with U.S. Appl. No. 13/599,762, mailed on Jul. 26, 2013, 38 pages.
The United States Patent and Trademark Office, "Final Office Action," issued in connection with U.S. Appl. No. 13/599,762, mailed on Feb. 6, 2014, 34 pages.
The United States Patent and Trademark Office, "Advisory Action," issued in connection with U.S. Appl. No. 13/599,762, mailed on Apr. 28, 2014, 7 pages.
The United States Patent and Trademark Office, "Non-Final Office Action," issued in connection with U.S. Appl. No. 13/599,762, mailed on Sep. 12, 2014, 36 pages.
Emerson Process Management, "Fisher FB Control Valve," Sep. 2014, 12 pages.
Emerson Process Management, "Inverted Globe Valve Applications," Oct. 2001, 5 pages.
Emerson Process Management, "Fisher EZ-C, ET-C, and EWT-C Cryogenic Sliding-Stem Control Valves," Oct. 2014, 24 pages.
Emerson Process Management, "Fisher ED, EAD, and EDR Sliding-Stem Control Valves," Dec. 2012, 24 pages.
Emerson Process Management, "Fisher EU and EW Valves NPS 12 through 24 x 20," Jul. 2014, 24 pages.
Emerson Process Management, "Designs FB and FBG Control Valves," Jan. 1993, 8 pages.
Emerson Process Management, "Design EUD, EUT-2, EWD, and EWT-2 Valves," Sep. 1993, 14 pages.
The United States Patent and Trademark Office, "Final Office Action," issued in connection with U.S. Appl. No. 13/599,762, mailed on Mar. 5, 2015, 27 pages.
United States Patent and Trademark Office, "Final Office Action," issued in connection with U.S. Appl. No. 13/828,539, Aug. 21, 2015, 18 pages.
United States Patent and Trademark Office, "Office Action," issued in connection with U.S. Appl. No. 13/828,539, mailed on Apr. 6, 2015, 25 pages.
United States Patent and Trademark Office, "Non-Final Office Action," issued in connection with U.S. Appl. No. 13/599,762, mailed on Jul. 23, 2015, 17 pages.
Patent Cooperation Treaty, "International Preliminary Report on Patentability," issued in connection with Application No. PCT/US2014/022255, Sep. 15, 2015, 12 pages.
Patent Cooperation Treaty, "International Preliminary Report on Patentability," issued in connection with Application No. PCT/US2014/022251, Sep. 15, 2015, 7 pages.
United States Patent and Trademark Office, "Notice of Allowance," issued in connection with U.S. Appl. No. 13/828,539, Nov. 2, 2015, 17 pages.
United States Patent and Trademark Office, "Notice of Allowance," issued in connection with U.S. Appl. No. 13/599,762, Nov. 25, 2015, 12 pages.

* cited by examiner

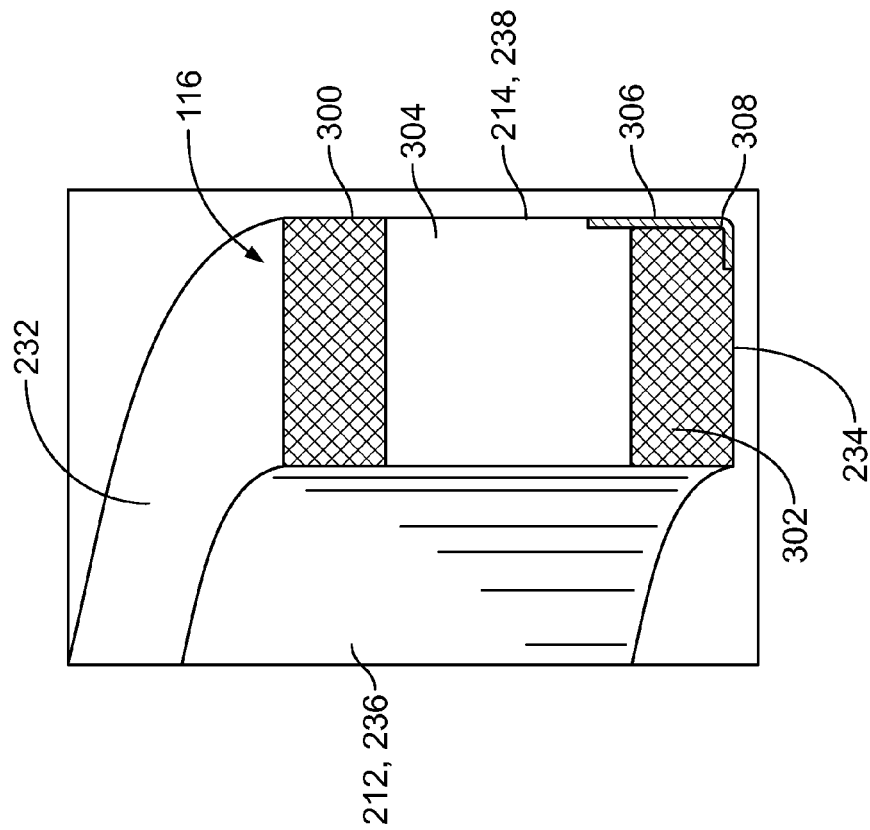
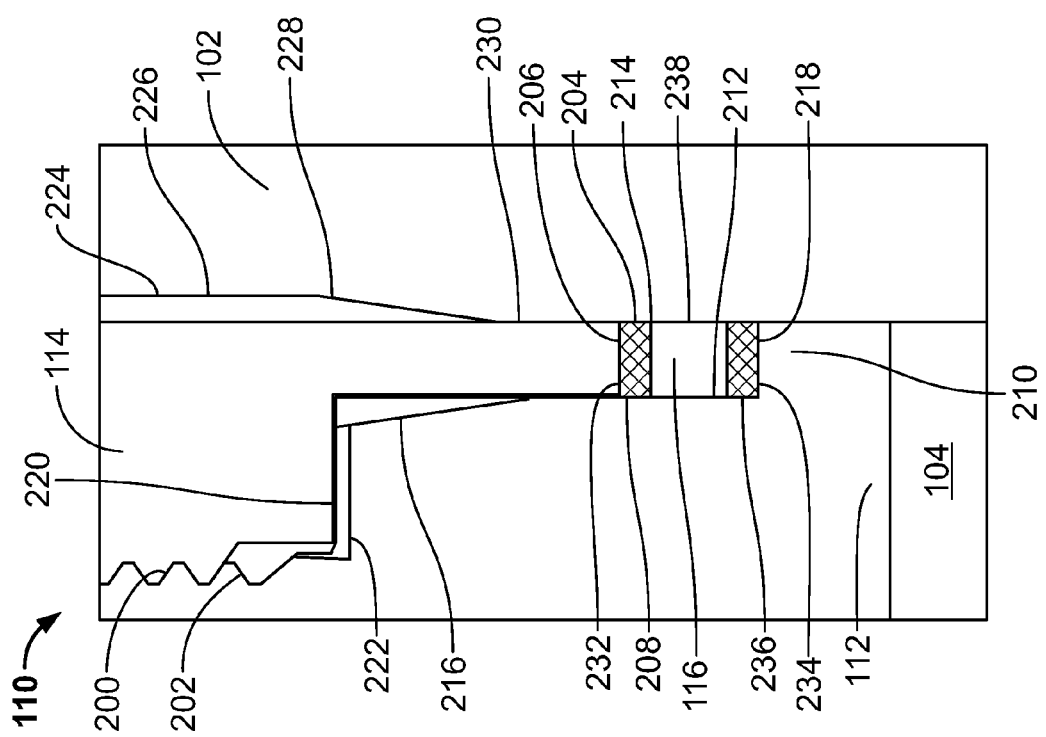

VALVE SEAT ASSEMBLIES

RELATED APPLICATIONS

This patent arises from a continuation-in-part of U.S. application Ser. No. 13/828,539, which was filed on Mar. 14, 2013 and is hereby incorporated herein by reference in its entirety.

FIELD OF THE DISCLOSURE

This disclosure relates generally to valves and, more particularly, to valve seat assemblies.

BACKGROUND

Control valves are often used in industrial processes such as, for example, oil and gas pipeline distribution systems and chemical processing plants to control flow of process fluids. For example, a sliding stem valve generally includes a flow control member (e.g., a plug) coupled to a stem. An actuator may drive the stem to move the flow control member between an open position and a closed position to allow or restrict fluid flow between an inlet and an outlet of the valve. Typically, the flow control member forms a fluid seal against a valve seat when the flow control member is in the closed position to prevent fluid flow through the valve.

SUMMARY

Valve seat assemblies are disclosed herein. An example apparatus includes a valve seat assembly including a cage and a valve seat coupled to the cage. The valve seat assembly is to be disposed in a valve body. The example apparatus also includes a seal having a first side, a second side, a third side and a fourth side. The first side, the second side and the third side are to be in contact with the valve seat assembly, and the fourth side is to be in contact with the valve body.

Another example apparatus disclosed herein includes a valve seat assembly including a first portion movable relative to a second portion. A seal is to be compressed between the first portion and the second portion, and a valve body is to receive the valve seat assembly. The seal is to be compressed between the valve seat assembly and the valve body to form a fluid seal.

An example method disclosed herein includes compressing a seal between a first surface and a second surface of the valve seat assembly. The valve seat assembly includes a valve seat and a cage. The example method further includes compressing the seal between a third surface of a valve body and a fourth surface of the valve seat assembly.

Another example apparatus disclosed herein includes a bracket to engage a portion of a valve seat suspended in a valve body via a cage. The example apparatus also includes a hanger rotatably coupled to the bracket. The hanger is to suspend the bracket in the valve body. The bracket is to be rotated to move at least the portion of the valve seat relative to the cage to compress a seal.

Yet another example apparatus disclosed herein includes means for engaging a valve seat coupled to a cage disposed in a valve body. The example apparatus also includes means for suspending the means for engaging in the valve body and means for rotatably coupling the means for suspending to the means for engaging. The means for engaging is to enable rotation of the valve seat relative to the cage to compress a seal.

The features, functions and advantages that have been discussed can be achieved independently in various examples or may be combined in yet other examples further details of which can be seen with reference to the following description and drawings.

BRIEF DESCRIPTION OF THE DRAWINGS

FIG. 2 illustrates an example valve seat assembly of the valve of FIG. 1.

FIG. 3 illustrates an example seal of the valve seat assembly of FIG. 2.

Figure 1:
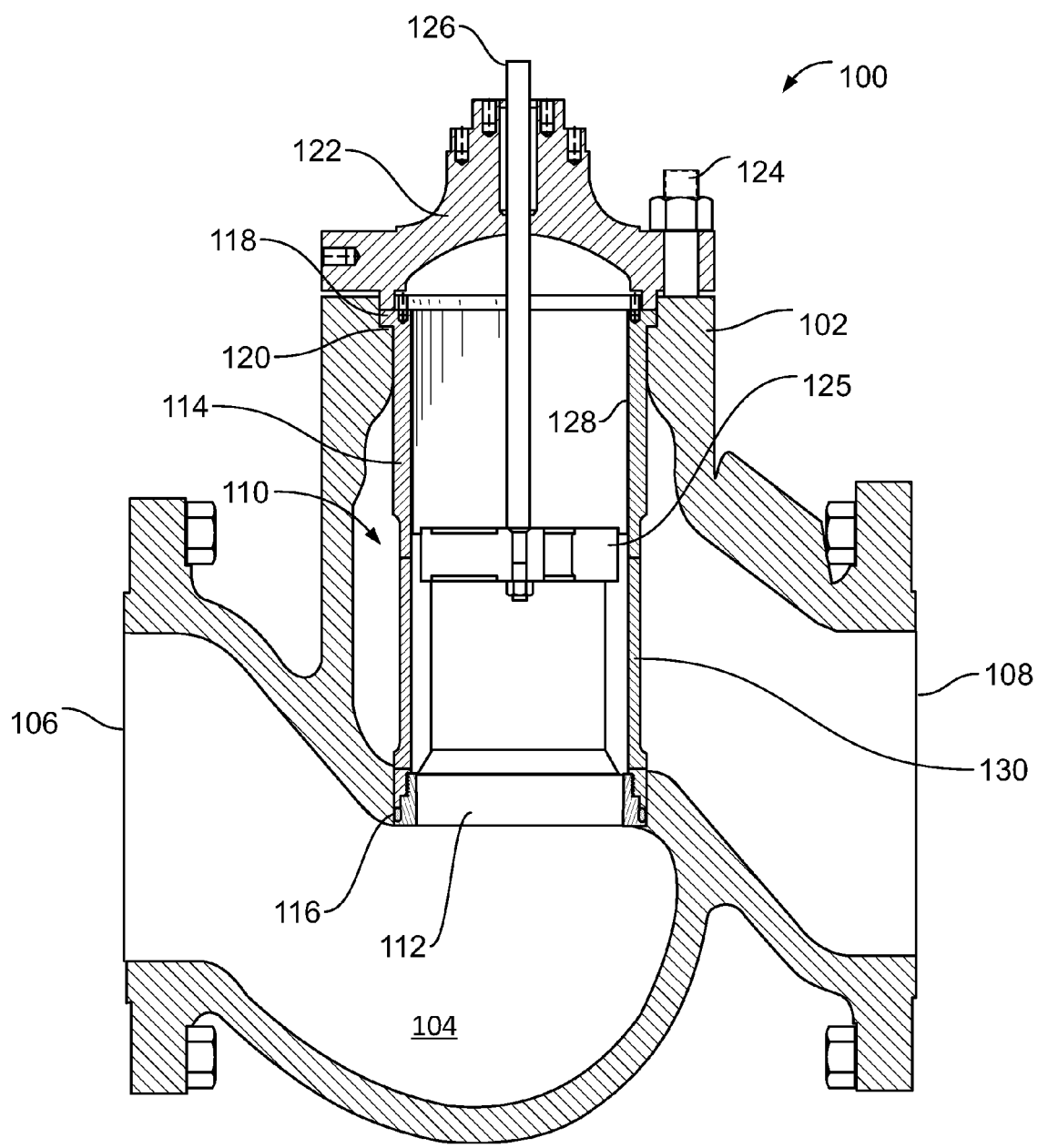
FIG. 1 illustrates an example valve disclosed herein.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Valve seat assemblies are disclosed herein. An example valve seat assembly may include a valve seat suspended in a valve body via a cage. In some examples, the valve seat assembly includes a seal to provide a fluid seal between the valve seat assembly and the valve body. Three sides of the seal may be in contact with the valve seat assembly, and one side of the seal may be in contact with the valve body. In some examples, the valve body includes a tapered portion to gradually compress the seal between the valve seat assembly and the valve body. In other examples, a first portion of the valve seat assembly is movable relative to a second portion of the valve seat assembly, and the seal is disposed between the first portion and the second portion. In some examples, when the valve seat assembly is disposed in the valve body, the first portion may be moved relative to the second portion to compress the seal along two, substantially perpendicular axes to enable the seal to provide a fluid seal against the valve body.

FIG. 1 illustrates an example valve 100 disclosed herein. While the following examples are described in conjunction with the example valve 100 of FIG. 1, the example methods and apparatus disclosed herein may be implemented using other valves such as, for example, one or more valves described in U.S. application Ser. No. 13/599,762, entitled "Valve Seat Apparatus for Use with Fluid Valves," filed on Aug. 30, 2012 and/or U.S. application Ser. No. 13/828,539, entitled "Valve Seat Apparatus for Use With Fluid Valve," filed Mar. 14, 2013, which are hereby incorporated by reference herein in their entirety. In the illustrated example, the valve 100 includes a valve body 102 defining a fluid flow passageway 104 between an inlet 106 and an outlet 108. The example valve 100 includes a valve seat assembly 110. In the illustrated example, the valve seat assembly 110 includes a valve seat 112, a cage 114 and a seal 116. The example cage 114 of FIG. 1 includes a flange 118 to support the cage 114 on a lip 120 of the valve body 102 adjacent a bonnet 122. In the illustrated example, the bonnet 122 is coupled to the valve body 102 via a plurality of fasteners 124 (e.g., bolts) and engages the flange 118 of the cage 114 to retain the cage 114 within the valve body 102. When the valve seat assembly 110 is coupled to the valve body 102, the example valve seat 112 of FIG. 1 is suspended in the valve body 102 via the cage 114. The example cage 114 facilitates maintenance, removal and/or replacement of valve trim components such as, for example, a plug 125, a stem 126, etc.

In the illustrated example, the cage 114 defines a bore 128 to receive fluid from the inlet 106 and guide movement of the plug 125. The plug 125 may move between a closed position in which the plug 125 sealingly engages the valve seat 112 and an open position in which the plug 125 is sealingly disengaged from the valve seat 112 (e.g., spaced apart from the valve seat 112). The example cage 114 provides lateral stability, balance and alignment as the plug 125 moves between the open position and the closed position, thereby reducing vibrations and/or other mechanical stress.

The example cage 114 defines at least one opening 130 in fluid communication with the bore 128. When the plug 125 is in the open position, fluid may flow from the inlet 106 into the bore 128 and through at least a portion of the opening 130 of the cage 114 to the outlet 108. When the plug 125 is in the closed position, the plug 125 sealingly engages the valve seat 112 and obstructs the opening 130 to prevent fluid flow through the valve 100. Although the example valve 100 employs a plug 125, other examples may employ other closure or flow control members such as, for example, a piston.

The cage 114 facilitates and/or provides certain fluid flow characteristics through the valve body 102 (e.g., reducing noise and/or cavitation generated by the flow of fluid through the valve 100). In other examples, the cage 114 may be other sizes and/or shapes, define different number(s) and/or types of opening(s), etc. to provide particular, desired fluid flow characteristics such as, for example, to control fluid flow, reduce noise and/or cavitations, enhance pressure reductions of the fluid, etc. An actuator (not shown) is coupled to the plug 125 via the stem 126. The actuator moves the plug 125 between the open position and the closed position to control fluid flow through the fluid flow passageway 104.

FIG. 2 is an enlarged view of the example valve seat assembly 110 of FIG. 1. The cage 114 includes first threads 200 and the valve seat 112 includes second threads 202 to engage the first threads 200. In the illustrated example, the valve seat 112 is movably coupled to the cage 114 via the first threads 200 and the second threads 202.

In the illustrated example, the seal 116 prevents fluid flow (e.g., leakage) between the valve body 102 and the valve seat assembly 110. The example seal 116 is disposed in a space 204 (e.g., a groove, a recess, etc.) defined by the valve seat assembly 110. More specifically, the space 204 is defined by an end 206 of the cage 114, a first portion 208 of the valve seat 112, and a flange 210 of the valve seat 112. In some examples, the flange 210 is coupled to the valve seat 112. In other examples, the valve seat 112 and the flange 210 are integral.

In the illustrated example, the first portion 208 of the valve seat 112 has a first outer diameter less than a second outer diameter of the flange 210. The outer diameter of the flange 210 is approximately equal to an outer diameter of the example cage 114.

A first surface 212 (e.g., a surface defining an inner diameter) of the example seal 116 contacts the first portion 208 of the valve seat 112. A second surface 214 (e.g., a surface defining outer diameter) of the seal 116 may extend out of the space 204 (e.g., radially beyond the outer diameter of the cage 114 and/or the flange 210) to enable the seal 116 to form a fluid seal against the valve body 102. The example valve seat 112 includes a shoulder 216 (e.g., a tapered portion, a rounded edge, etc.) to facilitate assembly of the seal 116 and the valve seat 112. For example, the shoulder 216 may provide a clearance to enable the seal 116 to be placed or rest on a ledge 218 of the flange 210 via the shoulder 216. The valve seat 112 may then be threaded into the cage 114 to form (e.g., assemble) the valve seat assembly 110.

In the illustrated example, the seal 116 is in contact with the end 206 of the cage 114 and the flange 210. In some examples, the seal 116 is clamped (e.g., held and/or compressed) between the end 206 of the cage 114 and the flange 210 prior to the valve seat assembly 110 being coupled to the valve body 102. For example, the seal 116 may be clamped between the end 206 of the cage 114 and the flange 210 by disposing the seal 116 on the end 206 of the cage 114 or on the ledge 218 of the flange 210 and threading the second threads 202 of valve seat 112 onto the first threads 200 of the cage 114. As the valve seat 112 is threaded into the cage 114, the flange 210 moves toward the cage 114, and the flange 210 clamps (e.g., holds and/or compresses) the seal 116 against the end 206 of the cage 114. As described in greater detail below, when the example valve seat assembly 110 is coupled to the example valve body 102, the seal 116 is substantially held in place and/or compressed via four sides of the seal 116, and the seal 116 does not float in the space 204 (e.g., the seal 116 substantially does not move in the space 204 relative to the valve seat assembly 110 and/or the valve body 102).

In the illustrated example, the cage 114 defines a first step 220 between the first threads 200 and the end 206. The example valve seat 112 defines a second step 222 between the second threads 202 and first portion 208 of the valve seat 112. In some examples, the first step 220 and the second step 222 function as a stop. For example, as the valve seat 112 is threaded into the cage 114, the first step 220 may contact the second step 222 to substantially limit further threading and, thus, movement of the valve seat 112. As a result, the first step 220 and second step 222 prevent compression of the seal 116 between the end 206 of the cage 114 and the flange 210 beyond a threshold amount of compression.

In the illustrated example, a wall 224 of the example valve body 102 of FIG. 2 is shaped to gradually compact or compress the seal 116 between the valve body 102 and the valve seat 112 to load the seal 116 as the valve seat assembly 110 is lowered into the valve body 102. Loading the seal 116 involves subjecting the seal 116 to a given amount of mechanical stress to enable the seal 116 to form a fluid seal between at least two surfaces (e.g., between the first portion 208 of the valve seat 112 and the wall 224 of the valve body 102). In the illustrated example, the wall 224 of the valve body 102 defines a first bore 226, a tapered portion 228 and a second bore 230. Thus, a size of a space in the valve body 102 in which the valve seat assembly 110 is received decreases from the first bore 226 to the second bore 230 via the tapered portion 228.

As the valve seat assembly 110 is lowered in the valve body 102, the seal 116 contacts (e.g., slides along and/or against) the tapered portion 228 of the wall 224, and the seal 116 compresses or compacts between the tapered portion 228 of the wall 224 and the first portion 208 of the valve seat 112. As a result, the seal 116 is urged to expand toward the end 206 of the cage 114 and the ledge 218 of the valve seat 112. Because the seal 116 is in contact with the end 206 of the cage 114 and the ledge 218, the seal 116 compresses between the end 206 of the cage 114 and the ledge 218. Thus, the example seal 116 is compressed between four surfaces (e.g., the end 206 of the cage 114, the ledge 218, the valve body 102 and the first portion 208 of the valve seat 112). As the valve seat assembly 110 is further lowered into the valve body 102, the seal 116 is further compressed or compacted along the tapered portion 228 of the wall 224. When the valve seat assembly 110 is fully lowered into the valve body 102 (e.g., when the flange 118 of the cage 114 rests on the lip 120 of the valve body 102), the seal 116 is compressed or compacted between the second bore 230 of the wall 224 and the valve seat 112. In this manner, the example seal 116 loads and forms a fluid seal between the valve seat assembly 110 and the valve body 102.

In the illustrated example, the seal 116 includes a first side 232, a second side 234, a third side 236 and a fourth side 238. When the valve seat assembly 110 is coupled to the valve body 102, the first side 232 and the second side 234 of the example seal 116 contact the end 206 of the cage 114 and the flange 210 of the valve seat 112, respectively. The third side 236 (e.g., defined by the first surface 212) and the fourth side 238 (e.g., defined by the second surface 214) contact the valve seat 112 and the wall 224 of the valve body 102, respectively. Thus, three sides of the seal 116 are in contact with the valve seat assembly 110 and one side of the seal 116 is in contact with the valve body 102. FIG. 3 is an enlarged, cross-sectional view of the example seal 116 of FIGS. 1-2. While the example seal 116 of FIG. 3 is described in conjunction with the example valve seat assembly 110 of FIGS. 1-2, the example seal 116 of FIG. 3 may be used to implement the example seal of FIG. 4 and the example seal of FIG. 8 described below. The example seal 116 of FIG. 3 includes a first section 300, a second section 302 and a third section 304 disposed between the first section 300 and the second section 302. The example first section 300 and the example second section 302 include braided graphite foil reinforced with Inconel™. The first section 300 and the second section 302 are coupled to opposing sides of the third section 304. In the illustrated example, the first section 300 defines the first side 232 of the seal 116, and the second section 302 defines the second side 234 of the seal 116. In the illustrated example, the third section 304 includes graphite foil formed via a die. The above-noted number of sections, materials and construction techniques are merely examples and, thus, other numbers of sections, materials and/or construction techniques may be employed without departing from the scope of this disclosure. Further, although the example seal 116 of FIG. 3 has a rectangular cross-sectional shape, other example seals may have other cross-sectional shapes such as, for example, circular, elliptical, etc.

During operation of the example valve 100, the valve 100 may be subjected to a variety of process temperatures. As a result, components of the valve 100 (e.g., the valve seat 112, the cage 114, the valve body 102, etc.) may contract or expand due to thermal distortion. The example seal 116 of FIG. 3 is flexible or pliable (e.g., has elastic properties and/or characteristics), which enables the example seal 116 to contract or expand with the valve seat assembly 110 and/or the valve body 102. As a result, the example seal 116 of FIG. 3 is capable of providing a fluid seal in operational temperatures from about −350 degrees Fahrenheit to about 1200 degrees Fahrenheit. Thus, the example valve 100 may be used applications involving a wide range of temperatures, including cryogenic temperatures, high temperatures, etc.

The example seal 116 of FIG. 3 includes a guard 306. In the illustrated example, the guard 306 is disposed on a corner or edge 308 of the seal 116 to enable the guard 306 to initially contact the tapered portion 228 of the wall 224 of the valve body 102 as the seal 116 is lowered into the valve body 102 with the valve seat assembly 110. The example guard 306 protects the seal 116 from damage, abrasion and/or wear as the seal 116 slides along the tapered portion 228 of the wall 224 as the valve seat assembly 110 is lowered into the valve body 102. In the illustrated example, the guard 306 has an L-shaped cross-section. Other examples have other cross-sectional shapes (e.g., rounded or curved, etc.). In some examples, the seal 116 does not include the guard 306.

Figure 4:
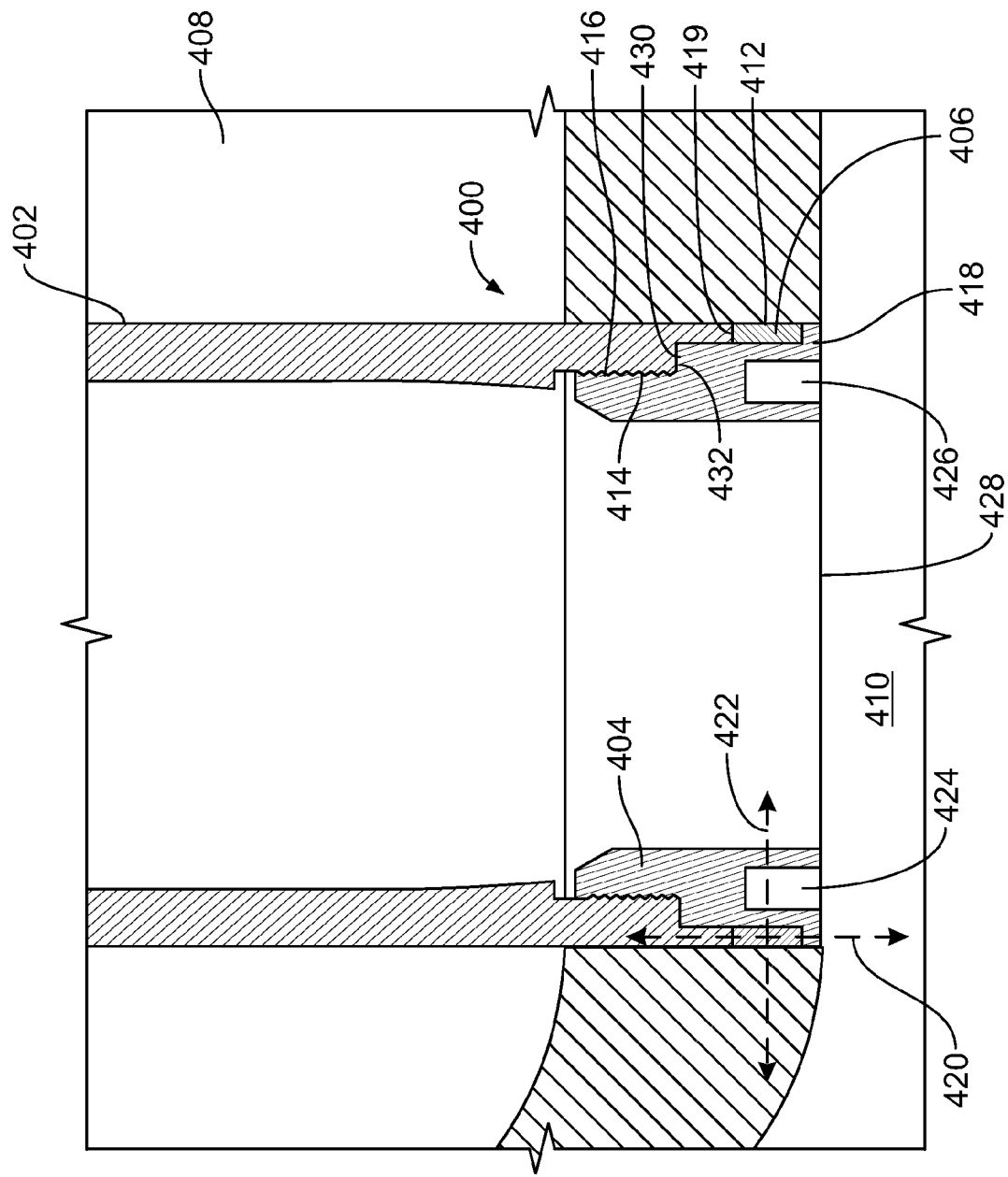
FIG. 4 illustrates another example valve seat assembly disclosed herein.

FIG. 4 illustrates another example valve seat assembly 400 disclosed herein. In the illustrated example, the valve seat assembly 400 includes a cage 402, a valve seat 404 and a seal 406. In the illustrated example, the valve seat assembly 400 is disposed in a valve body 408 along a fluid flow passageway 410. While the following examples are described in conjunction with the example valve body 408 of FIG. 4, the example methods and apparatus disclosed herein may be implemented using other valves and/or valve bodies such as, for example, one or more valves or valve bodies described in U.S. application Ser. No. 13/599,762, entitled "Valve Seat Apparatus for Use with Fluid Valves," filed on Aug. 30, 2012; U.S. application Ser. No. 13/828,539 entitled "Valve Seat Apparatus for Use With Fluid Valve;" and/or any other valve or valve body.

The example valve seat 404 is suspended in the valve body 408 via the cage 402 to be adjacent a wall 412 of the valve body 408. In the illustrated example, the cage 402 includes first threads 414 and the valve seat 404 includes second threads 416 to engage the first threads 414. The valve seat 404 is movably coupled to the cage 402 via the first and second threads 414 and 416. The example seal 406 is disposed between a flange 418 of the valve seat 404 and an end 419 of the cage 402. Thus, the seal 406 may be compressed by the flange 418 and the end 419 of the cage 402 along a first axis 420 (e.g., an axis substantially parallel to a longitudinal axis of the cage 402) by moving the valve seat 404 relative the cage 402 via the threads 414, 416. The example seal 406 is also compressed or compacted by the valve seat 404 and the wall 412 of the valve body 408 along a second axis 422 (e.g., an axis substantially perpendicular to the longitudinal axis of the cage 402) to load the seal 406.

In the illustrated example, the valve seat 404 includes female connectors 424 and 426 (e.g., recesses, cavities, etc.) to enable a valve seat adjustment apparatus 500 (FIG. 5) to engage the valve seat 404 to thread or unthread the valve seat 404 and the cage 402. The example female connectors 424 and 426 of FIG. 4 are disposed on an underside 428 of the valve seat 404 (e.g., a side of the valve seat 404 defining an end of the valve seat 404 and/or the flange 418). In other examples, the valve seat 404 includes male connectors (e.g., protrusions) to enable the valve seat adjustment apparatus 500 to engage the valve seat 404.

In the illustrated example, the cage 402 includes a first step 430 between the first threads 414 and the end 419. The example valve seat 404 includes a second step 432 between the second threads 416 and the flange 418. In the illustrated example, the first step 430 and the second step 432 function as a stop. For example, as the valve seat 404 is threaded into the cage 402, the second step 432 may contact the first step 430 to substantially prevent further threading of the valve seat 404 and the cage 402. In some examples, the first step 430 contacts the second step 432 when the flange 418 is a predetermined distance from the end 419 of the cage 402 to prevent compression of the seal 406 beyond a threshold amount of compression.

Figure 5:
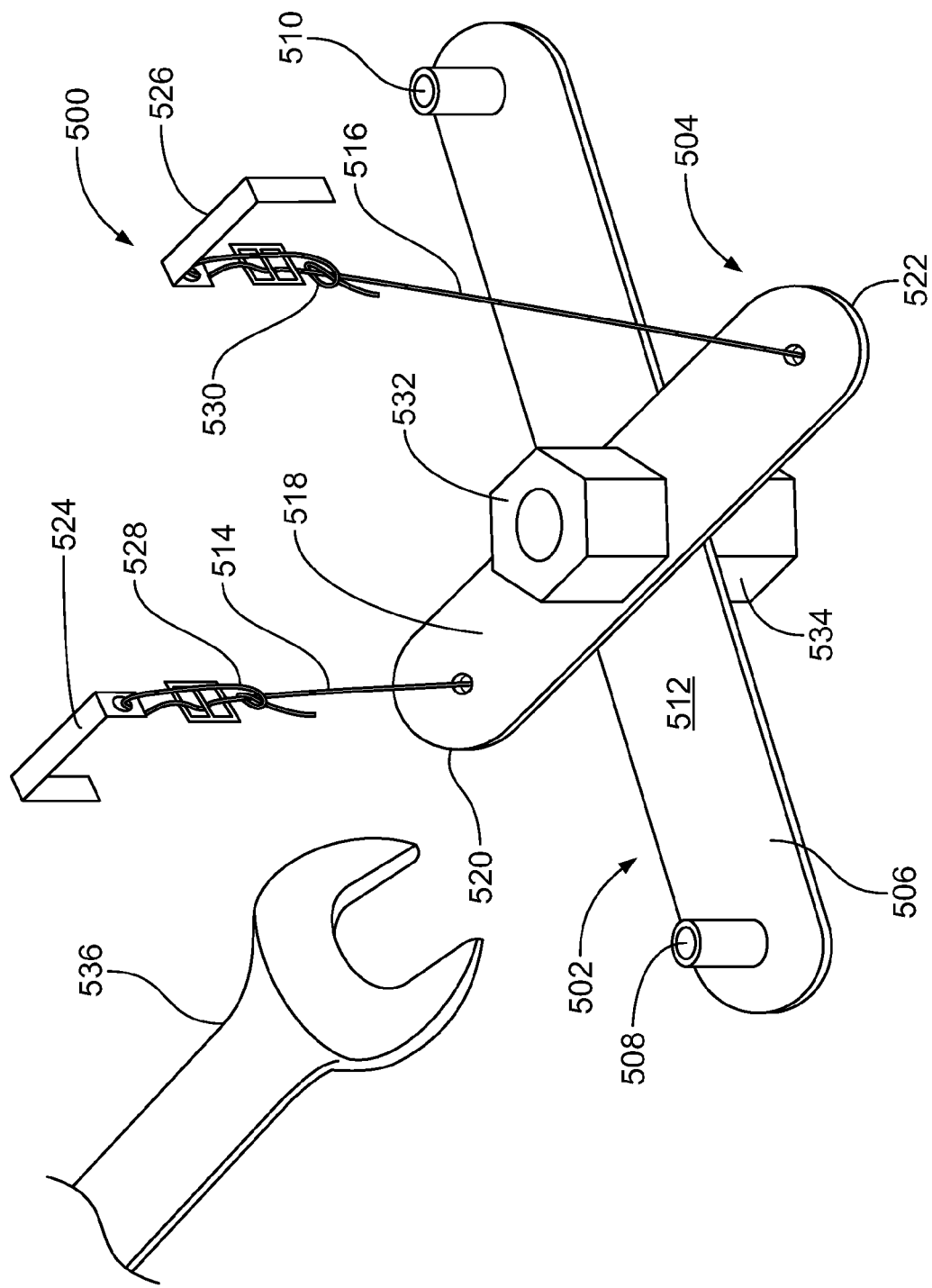
FIG. 5 illustrates an example valve seat adjustment apparatus disclosed herein.

FIG. 5 illustrates the example valve seat adjustment apparatus 500, which may be used to load the example seal 406 of FIG. 4 while the valve seat assembly 400 is disposed in the valve body 408. In the illustrated example, the valve seat adjustment apparatus 500 includes a first bracket 502 and a hanger 504. The example first bracket 502 engages the valve seat 404. When the first bracket 502 and the valve seat 404 are engaged, the first bracket 502 may be rotated to move the valve seat 404 relative to the cage 402 (e.g., thread or unthread the valve seat 404 and the cage 402). In the illustrated example, the first bracket 502 includes a first beam or bar 506. Male connectors 508 and 510 are disposed on the first bar 506. In the illustrated example, the male connectors 508 and 510 are cylindrical protrusions extending from a surface 512 of the first bar 506. In other examples, the male connectors 508 and 510 may be other shapes such as for example, rectangular, hexagonal, etc. As described in greater detail below, the male connectors 508 and 510 engage the female connectors 424 and 426 of the valve seat 404 to enable torque to be transferred from the valve seat adjustment apparatus 500 to the valve seat 404. In other examples, the first bar 506 includes female connectors (e.g., recesses) to receive one or more male connectors (e.g., protrusions) of the valve seat 404.

The example hanger 504 suspends or hangs the valve seat adjustment apparatus 500 from the valve body 408, the cage 402, and/or any other suitable portion of a valve component(s) and holds the first bracket 502 in engagement with the valve seat 404. In the illustrated example, the hanger 504 includes a first cable 514 and a second cable 516. The first cable 514 is coupled to a second beam or bar 518 adjacent a first end 520 of the second bar 518. The second cable 516 is coupled to the second bar 518 adjacent a second end 522 of the second bar 518. Other examples may include other numbers of cables (e.g., 1, 3, 4, 5, etc.). In the illustrated example, a length of the second bar 518 is less than an inner diameter of the valve seat 404 and/or the cage 402 to enable the second bar 518 to be disposed within a space defined by the inner diameter of the valve seat 404 and/or the cage 402 while the first bracket 502 engages the valve seat 404.

The example hanger 504 of FIG. 5 includes a first hook 524 coupled to the first cable 514. A second hook 526 is coupled to the second cable 516. In the illustrated example, the first hook 524 and the second hook 526 engage the cage 402, the valve body 408 and/or any other suitable valve component(s) and/or fixture(s) to suspend the first bracket 502 in the valve body 408. Other examples may utilize other techniques to enable the hanger 504 to engage the valve to suspend the first bracket 502 in the valve body 408.

Lengths of the example first cable 514 and the example second cable 516 are adjustable. In the illustrated example, the first cable 514 is operatively coupled to a first buckle 528. The example second cable 516 is operatively coupled to a second buckle 530. The first buckle 528 and the second buckle 530 may be used to adjust a length of the first cable 514 and the second cable 516, respectively, to lower the first bracket 502 or raise the first bracket 502 relative to the valve seat 404. The first and second buckles 528 and 530 may employ clasps, clamps, apertures through which the cables 514 and 516 are looped, pulleys, and/or any other suitable device and/or technique to enable the lengths of the cables 514 and 516 to be adjusted.

The example valve seat adjustment apparatus 500 of FIG. 5 includes a first coupling 532 and a second coupling 534. The first coupling 532 is disposed on a first side of the first bracket 502. The example second coupling 534 is disposed on a second side of the first bracket 502 opposite the first side. In the illustrated example, the first coupling 532 and the second coupling 534 are hexagon-shaped protrusions (e.g., hex heads) to enable a first tool 536 and/or a second tool 700 (FIG. 7) to engage the first bracket 502 and facilitate torquing of the first bracket 502. In the illustrated example, the first tool 536 is an open-end wrench. However, the above-noted type of tool is merely an example and, thus, other tools (e.g., an Allen wrench, a socket wrench, a screwdriver, etc.) may be used without departing from the scope of this disclosure. Similarly, in other examples, the first coupling 532 and/or the second coupling 534 may be other shapes to facilitate engagement of the first tool 536 and the first coupling 532 and/or the second coupling 534. In some examples, the first coupling 532 and the second coupling 534 are female connections such as, for example, keyed (e.g., hexagonal) recesses to receive the first tool 536.

Figure 6:
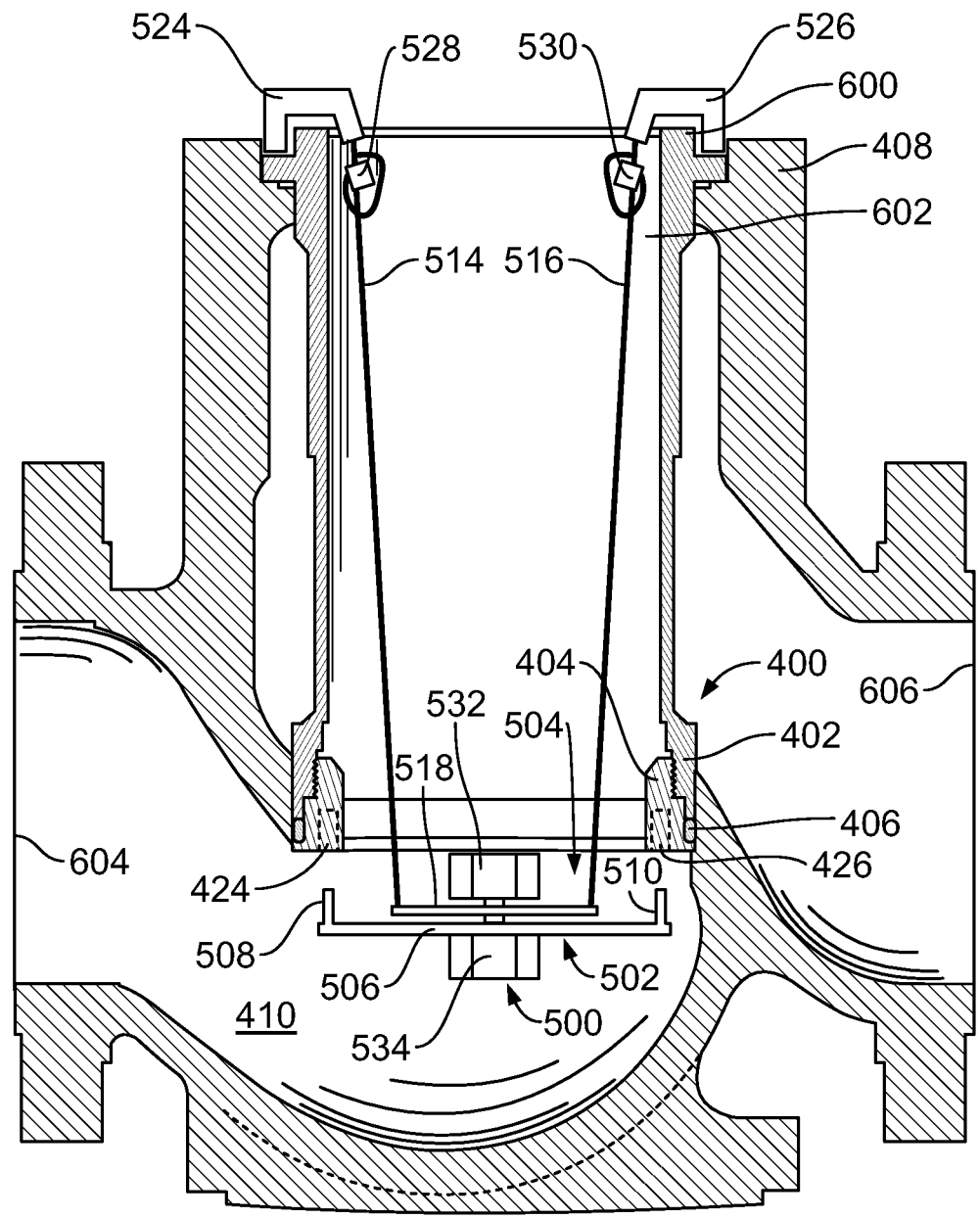
FIG. 6 illustrates the example valve seat adjustment apparatus of FIG. 5 operatively coupled to the example valve seat assembly of FIG. 4.

FIG. 6 illustrates the example valve seat adjustment apparatus 500 disposed in the valve body 408 of FIG. 4. In the illustrated example, the first hook 524 and the second hook 526 engage a lip 600 of the cage 402, and the first bracket 502 is suspended in the valve body 408 below the valve seat assembly 400 in the orientation of FIG. 6. The example first bracket 502 may be lowered into the valve body 408 through a bore 602 of the cage 402. In the illustrated example, a flow control member (e.g., a plug, a piston, etc.) is decoupled and/or removed from the valve body 408 to facilitate disposal of the example valve seat adjustment apparatus 500 inside the valve body 408. In other examples, the flow control member is coupled to the valve body 408 when the valve seat adjustment apparatus 500 is positioned into and/or disposed inside the valve body 408. In some examples, the first bracket 502 is positioned in the valve body 408 via an inlet 604 or an outlet 606 of the valve body 408, and the first cable 514 and the second cable 516 are fed through the bore 602 of the cage 402 to enable the first and second hooks 524 and 526 to engage the lip 600 of the cage 402. In other examples, the first hook 524 and the second hook 526 engage other portion(s) of the valve seat assembly 400 and/or the valve body 408, other valve component(s) and/or fixture(s).

Figure 7:
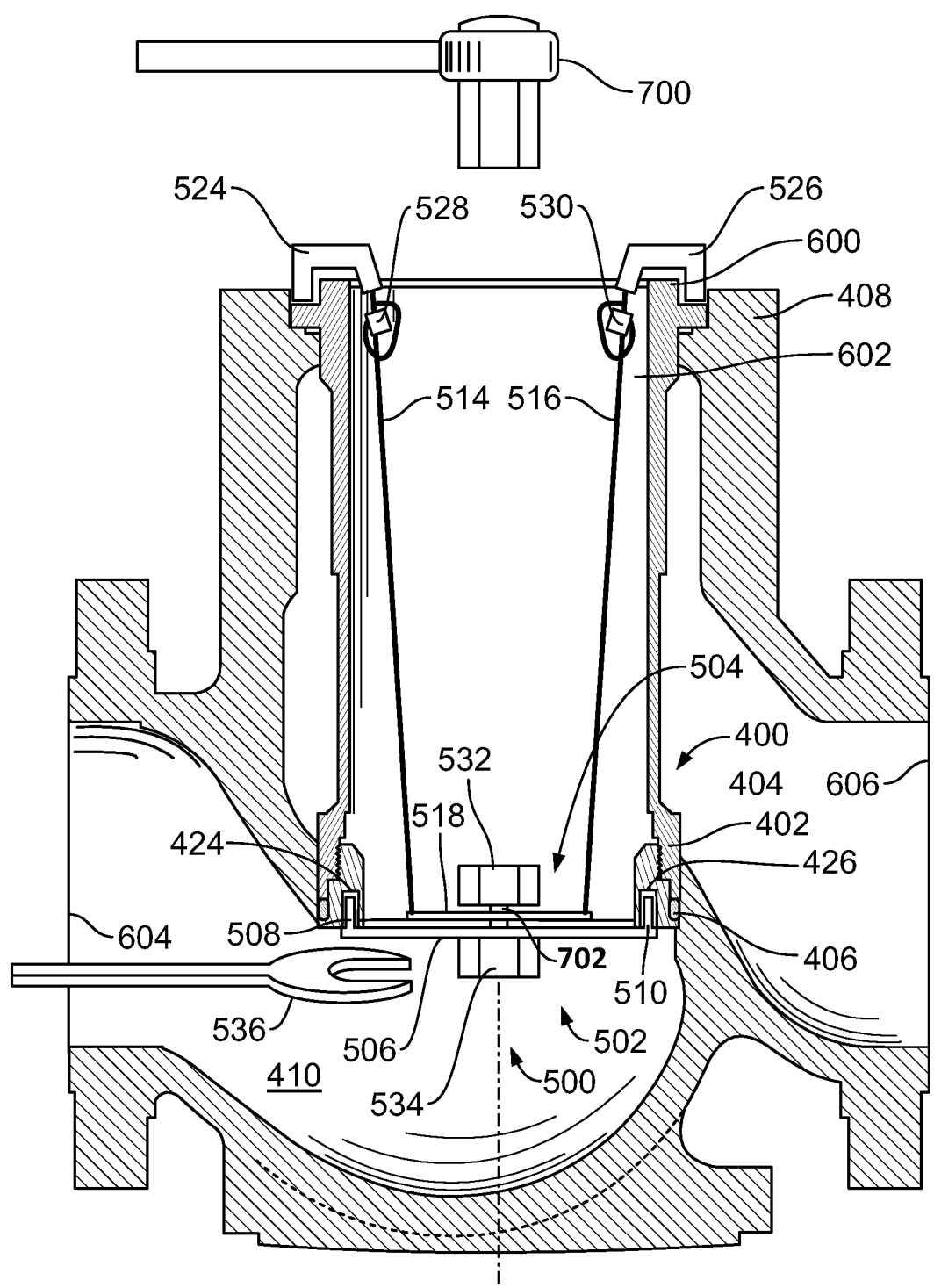
FIG. 7 illustrates the example valve seat adjustment apparatus of FIGS. 5-6 engaging the valve seat assembly of FIG. 4.

FIG. 7 illustrates the example first bracket 502 of the valve seat adjustment apparatus 500 engaging the example valve seat 404 of FIG. 4. In the illustrated example, once the first bracket 502 is positioned below the valve seat 404 (e.g., via the inlet 604, the outlet 606, by lowering the first bracket 502 through the cage 402, etc.) in the orientation of FIG. 7, the lengths of the first cable 514 and the second cable 516 may be shortened via the buckles 528 and 530 to move the male connectors 508 and 510 of the valve seat adjustment apparatus 500 into engagement with the female connectors 424 and 426 of the valve seat 404. Once the male connectors 508 and 510 are in engagement with the female connectors 424 and 426, the example first bracket 502 may be rotated to thread or unthread the valve seat 404 and the cage 402 to move the valve seat 404 relative to cage 402.

In the illustrated example, the first coupling 532 is accessible via the bore 602 of the cage 402. Thus, the first bracket 502 may be rotated by lowering a second tool 700 into the valve body 408 via the bore 602 of the cage 402, engaging the first coupling 532 with the second tool 700, and applying a sufficient amount of torque to the first coupling 532 via the second tool 700. The second coupling 534 is accessible via the inlet 604 of the example valve body 408. Thus, in the illustrated example, the first bracket 502 may be rotated by inserting the first tool 536 into the valve body 408 via the inlet 604, engaging the second coupling 534 with the first tool 536, and applying a sufficient amount of torque to the second coupling 534 via the first tool 536.

In the illustrated example, the first bracket 502 is rotatably coupled to the second bar 518 to enable the second bar 518 to remain substantially stationary relative to the cage 402 to prevent the cables 514 and 516 from entangling while the first bracket 502 is rotated via the first tool 536. In the illustrated example, the first coupling 532 includes a neck 702, and the example second bar 518 is rotatably coupled to the first bracket 502 via the neck 702. For example, the second bar 518 may define an aperture through which the neck 702 extends, and the neck 702 provides an axis of rotation about which the first bracket 502 rotates relative to the second bar 518.

As the first bracket 502 is rotated, the valve seat 404 moves relative to the cage 402 to compress or decompress the seal 406. Thus, a position of the valve seat 404 is adjustable relative to a position of the cage 402, and a torque applied to the first bracket 502 may be controlled to control an amount of rotation of the valve seat 404 and, thus, compression of the seal 406. Therefore, the example valve seat adjustment apparatus 500 may be used to load the seal 406 to enable the seal 406 to provide a fluid seal against the valve body 408.

Figure 8:
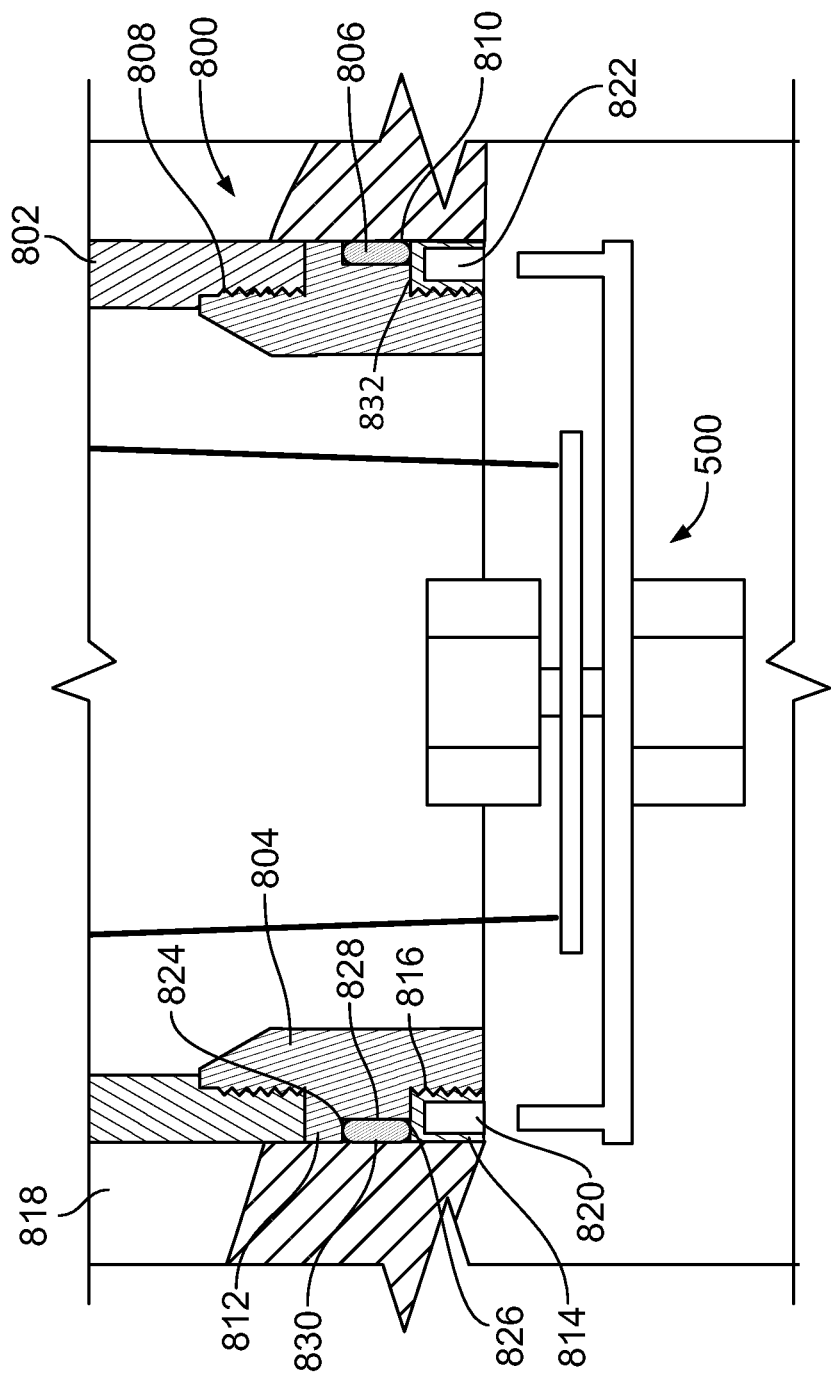
FIG. 8 illustrates another example valve seat assembly disclosed herein.

FIG. 8 illustrates another example valve seat assembly 800 disclosed herein. In the illustrated example, the valve seat assembly 800 includes a cage 802, a valve seat 804 and a seal 806. The example valve seat 804 of FIG. 1 is coupled to the cage 802. In the illustrated example, the valve seat 804 is coupled to the cage 802 via first threads 808. In other examples, the valve seat 804 is coupled to the cage 802 via other techniques (e.g., welding, mechanical fasteners such as, for example, bolts, etc.). In the illustrated example, the valve seat 804 defines a recess 810 in which the seal 806 is disposed. In the illustrated example, the valve seat 804 includes a flange 812 and a retainer 814 to define the recess 810. In the illustrated example, the seal 806 is interposes the flange 812 and the retainer 814.

In the illustrated example, the retainer 814 is movably coupled to the valve seat 804 via second threads 816 to enable the retainer 814 to load the seal 806. The example retainer 814 also enables the seal 806 to be clamped between the retainer 814 and the flange 812 prior to the example valve seat assembly 800 being disposed in the valve body 818 to facilitate assembly of the valve seat assembly 800 outside of a valve body 818. In the illustrated example, the retainer 814 includes female connections 820 and 822 (e.g., recesses, cavities, etc.) to enable the example valve seat adjustment apparatus 500 of FIG. 5 to engage the retainer 814 and move the retainer 814 toward the cage 802 via the second threads 816. As the retainer 814 compresses the seal 806 against the flange 812, the seal 806 is urged to expand toward the valve body 818. As a result, the seal 806 is compressed or compacted by the valve body 818 and valve seat 804, thereby loading the seal. When the example seal 806 is loaded, a first side 824 of the seal 806 is in contact with the flange 814, a second side 826 of the seal 806 is in contact with the retainer 814, a third side 828 of the seal 806 is in contact with the valve seat 804, and a fourth side 830 of the seal 806 is in contact with the valve body 818. Thus, the example seal 806 is compressed between the first side 824 and the second side 826 and between the third side 828 and the fourth side 830.

In the illustrated example, the valve seat 804 functions as a stop (e.g., provides a motion limit) to the retainer 814. For example, as the retainer 814 threads into the valve seat 804, an end 832 of the retainer 814 initially contacts the seal 806. If the retainer 814 is further threaded into the valve seat 804, the end 832 of the retainer 814 may contact the valve seat 804, thereby substantially preventing further threading of the retainer 814 and, thus further compression of the seal 806.

Figure 9:
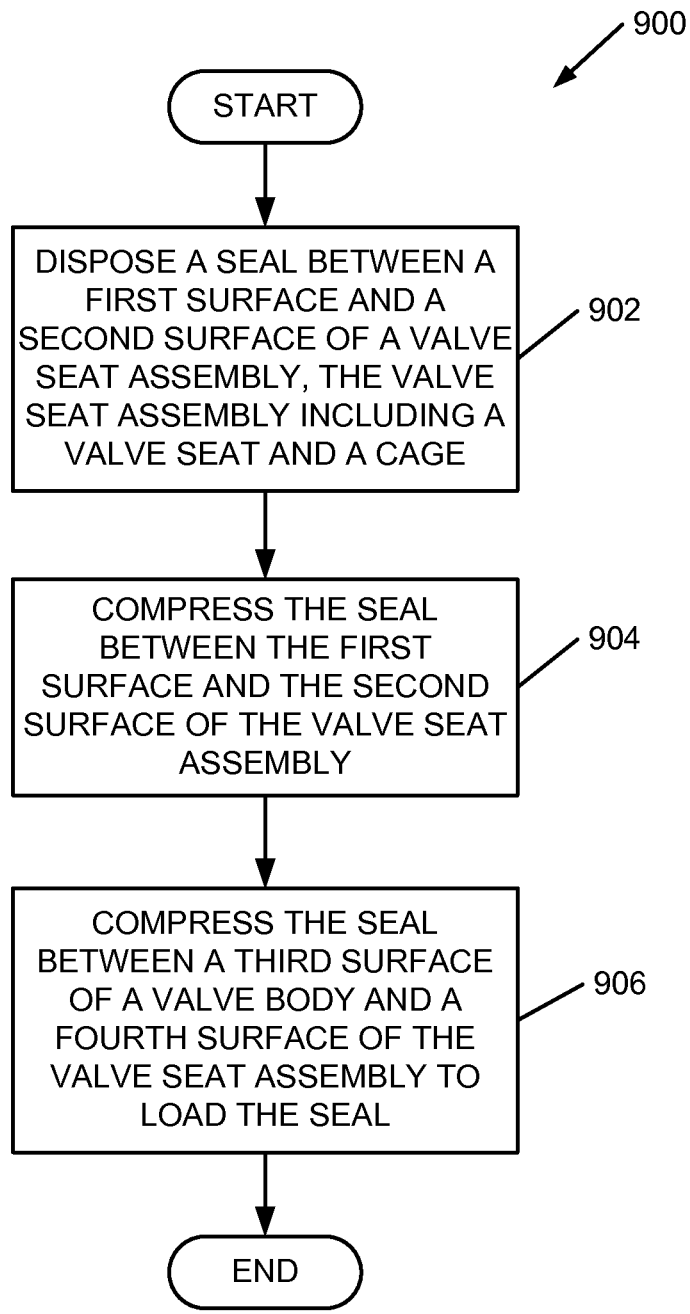
FIG. 9 illustrates a flowchart representative of an example method disclosed herein.

A flowchart representative of an example method 900 for assembling a valve is shown in FIG. 9. Although the example method 900 is described with reference to the flowchart illustrated in FIG. 9, many other methods to assemble a valve may alternatively be used. For example, the order of execution of the blocks may be changed, and/or some of the blocks described may be changed, eliminated, or combined.

The method 900 of FIG. 9 begins at block 902 by disposing a seal between a first surface and a second surface of a valve seat assembly. For example, the seal 116 of FIG. 1 may be disposed between the ledge 218 of the valve seat 112 and the end 206 of the cage 114. In some examples, the end 206 of the cage 114 contacts the first side 232 of the seal 116, and flange 210 of the valve seat 112 contacts the second side 234 of the seal 114.

In some examples, the seal 406 is disposed around the valve seat 404, and the valve seat 404 is threaded into the cage 402 to dispose the seal 406 between the flange 418 and the end 419 of the cage 402. In other examples, the seal 806 is disposed in the recess 810 of the valve seat 804, and the retainer 814 is threaded into the valve seat 804 to dispose the seal 806 between the retainer 814 and the flange 812. The example valve seat 804 of FIG. 8 may then be coupled to the cage 802 to form the valve seat assembly 800. In some examples, the valve seat 804 is coupled to the cage 802 prior to disposing the seal 806 between the retainer 814 and the flange 812.

At block 904, the seal is compressed between the first surface and the second surface of the valve seat assembly. In some examples, once the seal 116 of FIG. 1-3 is disposed on the ledge 218, the second threads 202 of the valve seat 112 may be threaded with the first threads 200 of the cage 114 to hold and/or compress the seal 116 between the flange 210 and the end 206 of the cage 114. The example seal 116 of FIGS. 1-3 is then further compressed between the end 206 of the cage 114 and the ledge 218 of the valve seat 208 as the valve seat assembly 110 lowers into the valve body 102. For example, when the tapered portion 228 of the wall 224 of the valve body 102 contacts the seal 116 and compresses the seal 116 against the first portion 208 of the valve seat 112, the seal 116 is urged to expand toward the end 206 of the cage 114 and the ledge 218 of the valve seat 112. Because the first side 232 and the second side 234 of the seal 116 are in contact with the end 206 of the cage 114 and the ledge 218 of the valve seat 112, respectively, as the valve seat assembly 110 is lowered into the valve body 102, the seal 116 compresses between the end 206 of the cage 114 and the ledge 218.

In some examples, the valve seat adjustment apparatus 500 is suspended in the valve body 408 to engage the valve seat 404 when the valve seat assembly 400 is disposed inside the valve body 408. Torque may be applied to the valve seat adjustment apparatus 500 via the first tool 536 and/or the second tool 700 to move the flange 418 of the valve seat 404 toward the end 419 of the cage 402 via the threads 414 to compress the seal 406 between the flange 418 and the end 419 of the cage along the first axis 420. In other examples, the retainer 814 is threaded into the valve seat 804 via valve seat adjustment apparatus 500 to compress the seal 806 between the retainer 814 and the flange 812.

At block 906, the seal is compressed between a third surface of the valve body and a fourth surface of the valve seat assembly to load the seal. For example, as the example valve seat assembly 110 of FIGS. 1-2 is further lowered into the valve body 102, the example seal 116 compresses between the first portion 208 of the valve seat 112 and the second bore 230 of the wall 224 to load the seal 116. Thus, the four sides 232, 234, 236, 238 of the example seal 116 are in contact with the example valve 100 when the seal 116 is loaded.

In some examples, the example seal 406 of FIG. 4 is loaded by moving the flange 418 of the valve seat 404 toward the end 419 of the cage 402 to further compress the seal 406 between the flange 418 and the end 419 of the cage along the first axis 420. As the seal 406 is compressed along the first axis 420, the seal is urged to expand along the second axis 422. Expansion of the seal 406 along the first axis 420 enables the seal 406 to also be compressed or compacted between the wall 412 of the valve body 408 and the valve seat 404 along the second axis 422, thereby loading the seal 406. Thus, when the example seal 406 is loaded, the example seal 406 is compressed along both the first axis 420 and the second axis 422.

In some examples, the retainer 814 is employed to enable the seal 806 to be compressed between the example valve seat 804 and the example valve body 818. For example, when the valve seat assembly 800 is disposed in the valve body 818, the retainer 814 moves toward the flange 812 to compress the seal 806. As the example seal 806 is compressed between the retainer 814 and the flange 812, the seal 806 is urged to expand toward the valve body 818 and the valve seat 804. As a result, the valve seat valve seat 804 and the valve body 818 contact the third side 828 and the fourth side 830 of the seal 806, respectively, and compress the seal 806 between the valve seat 804 and the valve body 818.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An apparatus, comprising:
   a valve seat assembly including a cage and a valve seat coupled to the cage, the valve seat assembly to be disposed in a valve body, the valve seat assembly having a first portion removably coupled to a second portion; and
   a seal having a first side, a second side, a third side and a fourth side, the first side, the second side and the third side to contact with the valve seat assembly, and the fourth side to contact the valve body, at least a portion of the valve seat being movable relative to the cage to compress the seal, the seal being compressed between the first portion and the second portion.

2. The apparatus of claim 1, wherein the seal comprises a first portion composed of graphite.

3. The apparatus of claim 1, wherein the seal includes a guard.

4. The apparatus of claim 1, wherein the seal is disposed on an end of the cage.

5. The apparatus of claim 1, wherein the seal is disposed in a recess defined by the valve seat.

6. The apparatus of claim 1, wherein the seal is to be used with a process fluid having a temperature between about −350 degrees Fahrenheit and about 1200 degrees Fahrenheit.

7. The apparatus of claim 1, wherein the first portion is the valve seat and the second portion comprises a flange movably coupled to the valve seat.

8. The apparatus of claim 1, wherein the valve seat includes first threads and the cage includes second threads to mate with the first threads.

9. The apparatus of claim 1, further comprising the valve body to receive the valve seat and the cage.

10. The apparatus of claim 9, wherein the valve seat is suspended in the valve body via the cage.

11. The apparatus of claim 9, wherein the valve body defines a tapered surface, the seal to be compressed between the tapered surface and the valve seat assembly.

12. An apparatus, comprising:
    a valve seat assembly including a cage and a valve seat coupled to the cage, the valve seat assembly to be disposed in a valve body, the valve seat including a first portion and a second portion, the first portion having an outer diameter that is less than a second outer diameter of the second portion to define a tapered surface between the first portion of the valve seat and the second portion of the valve seat; and
    a seal having a first side, a second side, a third side and a fourth side, the first side, the second side and the third side to contact with the valve seat assembly, and the fourth side to contact the valve body, the tapered surface of the valve seat to facilitate assembly of the seal with the valve seat.

13. The apparatus of claim 12, further comprising a valve body, the valve body defining a tapered surface to contact the fourth side to compress the seal.

14. The apparatus of claim 12, wherein the second portion of the valve seat defines a flange to receive one of the first side, the second side or the third side of the seal.

15. A method, comprising:
    compressing a seal between a first surface and a second surface of a valve seat assembly, the valve seat assembly including a valve seat and a cage;
    lowering the valve seat assembly into a valve body and contacting the seal along a tapered portion of a third surface of the valve body; and
    compressing the seal between the tapered portion of the third surface of the valve body and a fourth surface of the valve seat assembly.

16. The method of claim 15, further comprising
    moving at least a portion of the valve seat relative to the cage to compress the seal between the first surface and the second surface of the valve seat assembly.

17. The method of claim 16, wherein moving at least the portion of the valve seat comprises disposing a tool in the valve body and operatively coupling the tool to the valve seat.

18. An apparatus, comprising:
    a valve seat assembly including a cage and a valve seat coupled to the cage, the valve seat assembly to be suspended in a valve body via the cage;
    a seal having a first side, a second side, a third side and a fourth side, the first side, the second side and the third side to contact with the valve seat assembly, and the fourth side to contact the valve body;
    a bracket to engage a portion of the valve seat; and
    a hanger rotatably coupled to the bracket, the hanger to suspend the bracket in the valve body, wherein the bracket is to be rotated to move the valve seat relative to the cage to compress the seal.

19. The apparatus of claim 18, wherein a length of the hanger is adjustable.

20. The apparatus of claim 18, further comprising a coupling disposed on the bracket, the coupling to be engaged by a tool to rotate the bracket.

21. The apparatus of claim 18, wherein the bracket comprises a male connector to engage the portion of the valve seat.

22. The apparatus of claim 18, wherein the hanger comprises a cable.

23. An apparatus, comprising:
a valve seat assembly including a cage and a valve seat coupled to the cage, the valve seat assembly to be disposed in a valve body, the valve set to move relative to the cage to compress a seal between the valve seat and the cage, the valve seat including a connector to receive a valve seat adjustment tool used to move the valve seat relative to the cage.

24. The apparatus of claim 23, wherein the connector includes a plurality of connectors.

25. The apparatus of claim 24, wherein the connector includes a cavity formed on an underside of the valve seat.

\* \* \* \* \*